(12) United States Patent
Rugendyke et al.

(10) Patent No.: US 9,845,940 B2
(45) Date of Patent: Dec. 19, 2017

(54) LIGHTING DEVICE AND LIGHT PANEL CONSTRUCTION

(71) Applicant: Energizer Brands, LLC, St. Louis, MO (US)

(72) Inventors: Timothy Rugendyke, Woy Woy (AU); Angelo Kotsis, Marrickville (AU); John Brown, Mosman (AU); Michael Squires, Ryde (AU)

(73) Assignee: Energizer Brands, LLC, St. Louis, MO (US)

( * ) Notice: Subject to any disclaimer, the term of this patent is extended or adjusted under 35 U.S.C. 154(b) by 256 days.

(21) Appl. No.: 14/407,348

(22) PCT Filed: Jun. 10, 2013

(86) PCT No.: PCT/US2013/044944
§ 371 (c)(1),
(2) Date: Dec. 11, 2014

(87) PCT Pub. No.: WO2013/188278
PCT Pub. Date: Dec. 19, 2013

(65) Prior Publication Data
US 2015/0167943 A1 Jun. 18, 2015

Related U.S. Application Data

(60) Provisional application No. 61/658,088, filed on Jun. 11, 2012.

(51) Int. Cl.
*F21L 4/04* (2006.01)
*F21V 21/30* (2006.01)
(Continued)

(52) U.S. Cl.
CPC .............. *F21V 21/30* (2013.01); *F21L 4/005* (2013.01); *F21L 4/04* (2013.01); *F21V 5/048* (2013.01);
(Continued)

(58) Field of Classification Search
CPC ... F21L 4/005; F21L 4/027; F21L 4/04; F21L 4/045; F21V 5/048; F21V 21/30;
(Continued)

(56) References Cited

U.S. PATENT DOCUMENTS 5,339,225 A 8/1994 Wiggerman
5,584,556 A 12/1996 Yokoyama et al.
(Continued)

FOREIGN PATENT DOCUMENTS

DE 1112202 B 8/1961
DE 29614836 U1 2/1997
(Continued)

OTHER PUBLICATIONS

European Patent Office, Communication pursuant to Article 94(3) EPC for Application No. 13731207.0, Nov. 11, 2015, 5 pages.
(Continued)

*Primary Examiner* — Jason Moon Han
(74) *Attorney, Agent, or Firm* — Alston & Bird LLP

(57) ABSTRACT

A lighting device (10) having a base housing (12) to receive one or more batteries therein to power a light source located in a light housing (14). The light housing (14) being pivotally attached to the base housing (12) at pivot points on both sides of the base housing (12), wherein a handle (24) is provided which extends along the axis of rotation (13) between the pivot points.

25 Claims, 13 Drawing Sheets

(51) Int. Cl.

| | | |
|---|---|---|
| *F21V 29/70* | (2015.01) | |
| *F21L 4/00* | (2006.01) | |
| *F21V 5/04* | (2006.01) | |
| *F21V 21/40* | (2006.01) | |
| *F21V 23/00* | (2015.01) | |
| *F21V 8/00* | (2006.01) | |
| *F21W 111/10* | (2006.01) | |
| *F21Y 115/10* | (2016.01) | |

(52) U.S. Cl.
CPC .......... *F21V 21/406* (2013.01); *F21V 23/005* (2013.01); *F21V 29/70* (2015.01); *G02B 6/0095* (2013.01); *F21W 2111/10* (2013.01); *F21Y 2115/10* (2016.08); *G02B 6/0036* (2013.01); *G02B 6/0063* (2013.01); *G02B 6/0088* (2013.01)

(58) Field of Classification Search
CPC ...... F21V 21/406; F21V 23/005; F21V 29/70; G02B 6/0095
USPC ...... 362/190–191, 194–201, 249.02, 311.02, 362/330, 602, 612
See application file for complete search history.

(56) References Cited

U.S. PATENT DOCUMENTS

| | | |
|---|---|---|
| 5,613,751 A | 3/1997 | Parker et al. |
| 5,642,933 A | 7/1997 | Hitora |
| 5,708,749 A | 1/1998 | Kacheria |
| 5,743,634 A | 4/1998 | Sitzema et al. |
| 5,758,949 A | 6/1998 | Van Deursen |
| 5,808,708 A | 9/1998 | Oyama et al. |
| 6,024,463 A | 2/2000 | Ishikawa et al. |
| 6,027,221 A | 2/2000 | Ishikawa et al. |
| 6,167,182 A | 12/2000 | Shinohara et al. |
| 6,186,645 B1 | 2/2001 | Camarota |
| 6,205,691 B1 | 3/2001 | Urda et al. |
| 6,259,854 B1 | 7/2001 | Shinji et al. |
| D448,873 S | 10/2001 | Dalton et al. |
| 6,337,946 B1 | 1/2002 | McGaffigan |
| 6,469,833 B2 | 10/2002 | Eguchi |
| 6,520,655 B2 | 2/2003 | Ohuchi |
| 6,655,809 B2 | 12/2003 | Suzuki et al. |
| 6,808,281 B2 | 10/2004 | Ho |
| 6,966,685 B2 | 11/2005 | Li et al. |
| 7,011,442 B2 | 3/2006 | Okuwaki et al. |
| 7,223,005 B2 | 5/2007 | Lamb et al. |
| 7,497,611 B2 | 3/2009 | Chen et al. |
| 7,604,388 B2 | 10/2009 | Nishio et al. |
| 7,784,975 B2 | 8/2010 | Krebs et al. |
| 8,317,366 B2 | 11/2012 | Dalton et al. |
| 8,587,746 B2 | 11/2013 | Kim et al. |
| 8,845,170 B2 | 9/2014 | Kim et al. |
| 9,261,688 B2 | 2/2016 | Takeda et al. |
| 2001/0017773 A1 | 8/2001 | Suzuki et al. |
| 2001/0048603 A1 | 12/2001 | Ohuchi |
| 2002/0057562 A1 | 5/2002 | Sasako et al. |
| 2004/0085762 A1 | 5/2004 | Iwasa et al. |
| 2004/0095743 A1 | 5/2004 | Yu et al. |
| 2004/0105157 A1 | 6/2004 | Matsushita et al. |
| 2004/0125590 A1 | 7/2004 | Tsai |
| 2004/0130911 A1 | 7/2004 | Chen |
| 2004/0141104 A1 | 7/2004 | Yu et al. |
| 2004/0145914 A1 | 7/2004 | Yu et al. |
| 2005/0068767 A1 | 3/2005 | Uke et al. |
| 2007/0040959 A1 | 2/2007 | Liao |
| 2007/0285946 A1 | 12/2007 | Lin et al. |
| 2008/0151572 A1 | 6/2008 | Ma |
| 2008/0174720 A1 | 7/2008 | Fang |
| 2008/0260328 A1 | 10/2008 | Epstein |
| 2009/0201698 A1 | 8/2009 | Klick et al. |
| 2009/0231846 A1 | 9/2009 | Nakajima |
| 2009/0310350 A1 | 12/2009 | Dalton et al. |
| 2009/0316077 A1 | 12/2009 | Li et al. |
| 2010/0128198 A1 | 5/2010 | Kim et al. |
| 2011/0211340 A1 | 9/2011 | Smith |
| 2011/0255303 A1 | 10/2011 | Nichol et al. |
| 2012/0008309 A1 | 1/2012 | Hale |
| 2012/0057362 A1 | 3/2012 | Fritz et al. |
| 2012/0268966 A1 | 10/2012 | McCollum et al. |
| 2013/0044517 A1 | 2/2013 | Pinon |
| 2015/0138763 A1 | 5/2015 | Bennett et al. |
| 2016/0116744 A1 | 4/2016 | Takeda et al. |

FOREIGN PATENT DOCUMENTS

| | | |
|---|---|---|
| DE | 10320485 A1 | 12/2004 |
| EP | 1180640 A1 | 2/2002 |
| FR | 2796126 A3 | 1/2001 |
| JP | 4-108806 U | 9/1992 |
| JP | 2004-176425 A | 6/2004 |
| WO | WO 2000/045086 A1 | 8/2000 |
| WO | 0101039 A1 | 1/2001 |
| WO | 02081966 A1 | 10/2002 |
| WO | WO 2005/040676 A1 | 5/2005 |

OTHER PUBLICATIONS

European Patent Office, Communication pursuant to Article 94(3) EPC for Application No. 13731207.0, Mar. 2, 2016, 5 pages, Netherlands.

European Patent Office, Communication pursuant to Article 94(3) EPC for Application No. 13731207.0, Jun. 8, 2016, 4 pages, Netherlands.

International Searching Authority, International Search Report and Written Opinion for International Application No. PCT/US2013/044944, Oct. 1, 2013, 16 pages, European Patent Office, Netherlands.

LIGHTING DEVICE AND LIGHT PANEL CONSTRUCTION

FIELD OF THE INVENTION

The present invention relates to construction of lighting devices for use by consumers in camping, emergency or household applications and commercial or military applications.

BACKGROUND OF THE INVENTION

The lighting market is always looking for newer and better products to meet the needs of consumers. In recent times there has been a trend to high efficiency lighting products that utilize light emitting diodes (LEDs) as their light source.

Any reference herein to known prior art does not, unless the contrary indication appears, constitute an admission that such prior art is commonly known by those skilled in the art to which the invention relates, at the priority date of this application.

SUMMARY OF THE INVENTION

One aspect of the present invention relates to a lighting device having a base housing to receive one or more batteries therein to power a light source located in a light housing, the light housing being pivotally attached to the base housing at pivot points on both sides of the base housing, wherein a handle is provided which extends along the axis of rotation between the pivot points.

Another aspect of the invention relates to base and light housings each including a body and arms extending from opposed sides of the body.

Another aspect of the invention relates to the handle being formed on the base housing.

Another aspect of the invention relates to the light source housing being captured between front and rear portions of the base housing.

Another aspect of the invention relates to the handle including a mechanism to capture additional handle surfaces therein.

Another aspect of the invention relates to the base housing including a mechanism to pivotally capture a stand so as to be pivotally mounted to the base housing when assembled.

Another aspect of the invention relates to the lighting device being hand-held.

One aspect of the present invention relates to providing a light panel assembly for a portable lighting device, the light assembly including: a printed circuit board (PCB) having at least one LED thereon, and a generally flat, relatively thin lens extending away from the at least one LED, the at least one LED being arranged so as to emit light into an edge of the lens, wherein the lens includes at least one recess to receive the at least one LED and a circuit board on which the LED is arranged.

Another aspect of the invention relates to the light source including a recess for each LED on the PCB.

Another aspect of the invention relates to the PCB being attached to a heat sink.

Another aspect of the invention relates to the heat sink including projections thereon extending towards the lens.

Another aspect of the invention relates to the lens including a respective recess for each projection on the heat sink.

Another aspect of the invention relates to the recesses including in a bight formed along an edge of the lens.

Another aspect of the invention relates to the lens including an array of etched dots or shapes thereon to assist in the reflection or transmission or emission of light from the lens.

Another aspect of the invention relates to the lens including a flange extending along at least a portion of a periphery of the lens.

Another aspect of the invention relates to the lens being adapted to be held in the light housing in a cantilever fashion.

Another aspect of the invention relates to the recesses being located in a bight.

Another aspect of the invention relates to the securing apertures being located either side of the bight.

Another aspect of the invention relates to a seal being provided between the light housing surface and a surface of the lens.

Another aspect of the invention relates to the seal extending across a substantial portion of the width of the lens in the vicinity of the PCB and LEDs.

One aspect of the invention relates to a lighting panel assembly for a portable lighting device, the lighting panel assembly including: a PCB having at least one LED thereon, and a generally flat, relatively thin lens extending away from said at least one LED, said at least one LED being arranged so as to emit light into an edge of said lens and the lens includes at least one recess to receive said at least one LED and the PCB on which the LED is arranged.

Another aspect of the invention relates to the lighting panel assembly having each free edge thereof including a flange that extends laterally from the panel.

Another aspect of the invention relates to the lighting panel can include a front and rear planar surface and the flange extends in opposed directions away from the lighting panel.

Another aspect of the invention relates to a cross-section through a portion of the lighting panel can be either L-shaped in configuration, H-shaped in configuration, I-shaped in configuration; or a part of the lighting panel can be T-shaped in configuration.

Another aspect of the invention relates to the flange terminating in a radius.

BRIEF DESCRIPTION OF THE DRAWINGS

An embodiment or embodiments of the present invention will now be described, by way of example only, with reference to the accompanying drawings, in which.

DETAILED DESCRIPTION OF THE EMBODIMENT OR EMBODIMENTS

Figure 1:
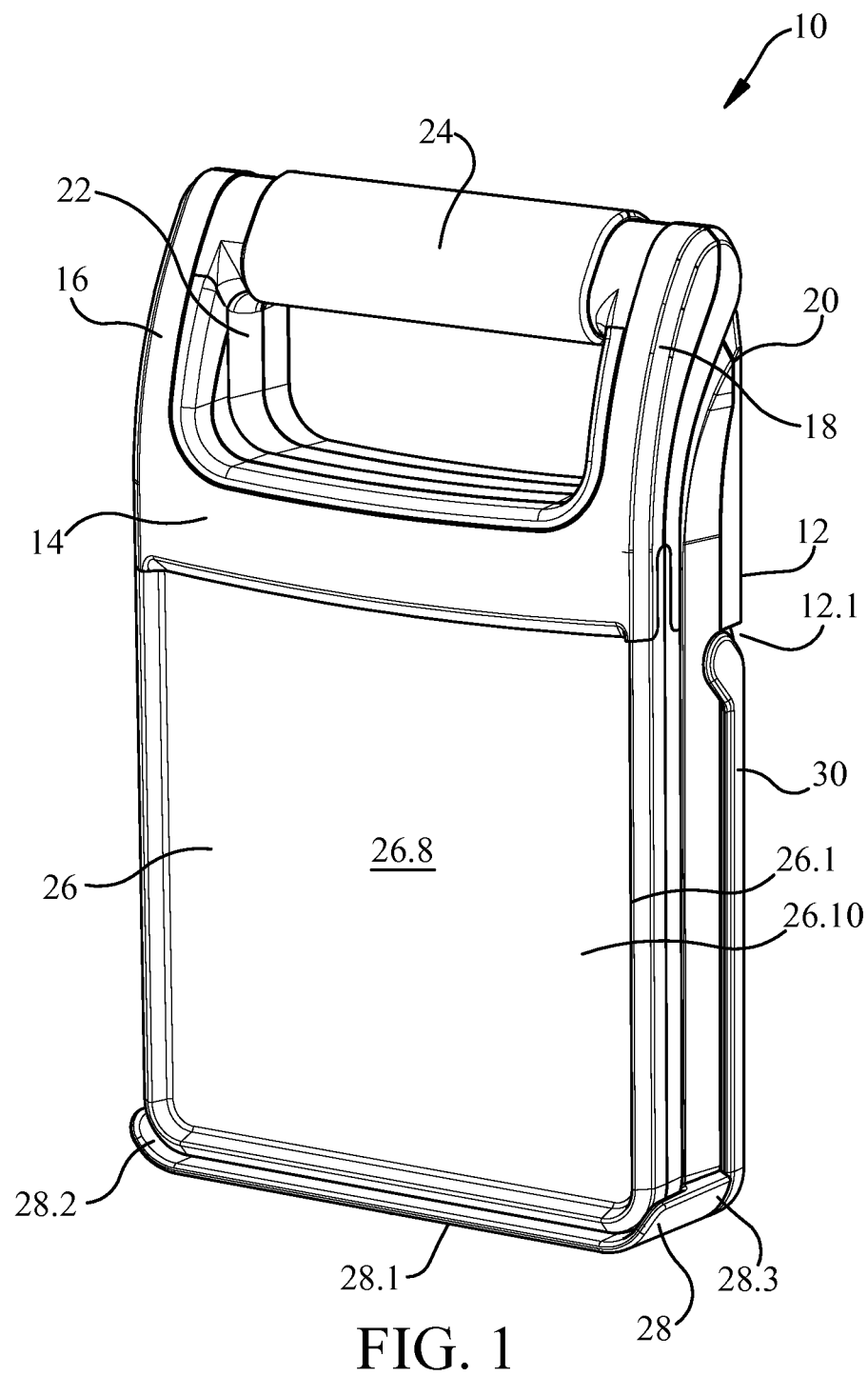
FIG. 1 illustrates a perspective view of a lighting device which functions as an area light.
Figure 2:
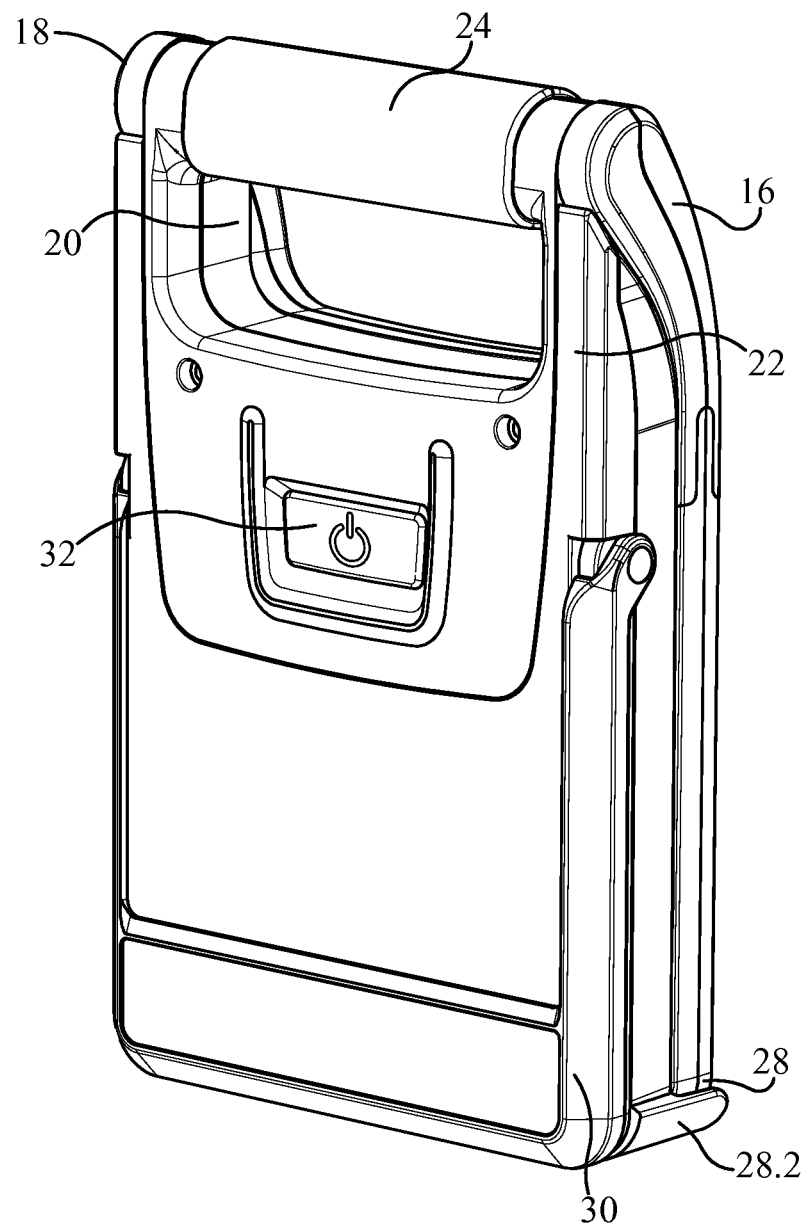
FIG. 2 illustrates a rear perspective view of the lighting device of FIG. 1.
Figure 3:
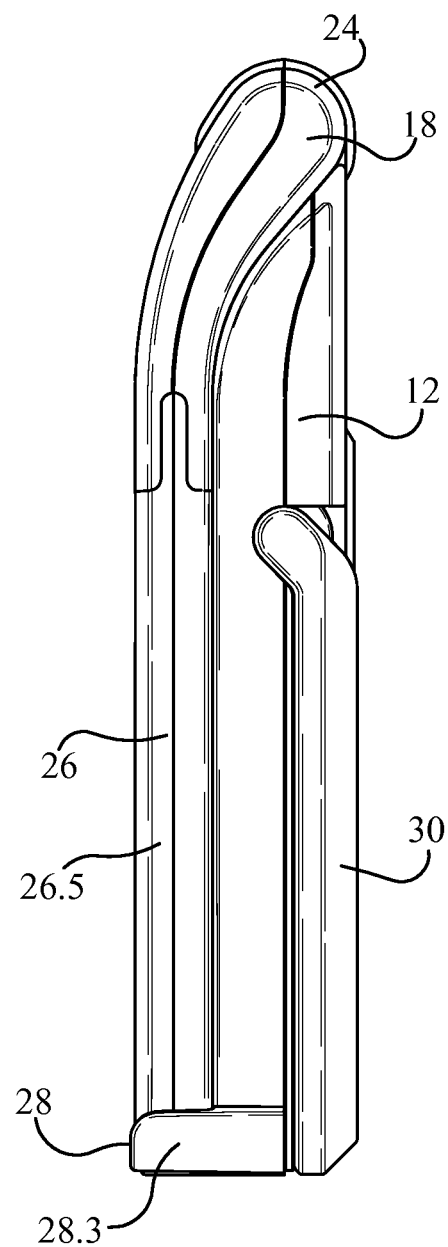
FIG. 3 illustrates a right side view of the lighting device of FIG. 1.

Illustrated in FIGS. 1 to 3 is a hand-held lighting device 10, which is shown in a collapsed or unextended state. The lighting device 10 includes a base housing 12, a light housing 14, and a lighting panel 26. The base housing 12 and light housing 14 are pivotally connected. The lighting panel 26, which functions as a lens, is connected to and/or formed in the light housing 14. The lighting device 10 is of a suitable size, shape and weight to be carried in a user's hand while walking and/or performing a task.

The base housing 12 includes a cavity to house batteries to power the lighting device 10. Referring to FIGS. 4-5 and 7-8, the base housing 12 functions as a base for the lighting device 10 by providing support and stability of the lighting device 10. Support and stability are provided by means of the mass of the base housing 12 when combined with the mass of the batteries to be housed in the cavity. For example, the base 12 acts as a base for the lighting device 10 and provides support and stability to the device due to the mass of the base housing 12 when combined with the mass of the batteries to be contained within the base housing 12. In another embodiment, the mass of the base housing 12 has sufficient mass to provide adequate support and stability without batteries stored therein.

The base housing 12 includes longitudinally extending arms 22 and 20, on either side thereof, to interact respectively with arms 16 and 18 of the light housing 14. The arms 20 and 22 may be integrally formed in the base housing and/or coupled to the base housing 12. The light housing 14, as is best illustrated in FIG. 1, includes a left arm 16 and a right arm 18, which extend from the body of the light housing 14. The arms 16, 18 may be integrally formed in the base housing and/or coupled to the base housing 12. As will be described in more detail later, the arms 16 and 18 of the lighting housing 14 may include portions thereof that are captured by the arms 20 and 22 on the base housing 12, such that the light housing 14 is pivotally attached to the base housing 12.

Figure 5:
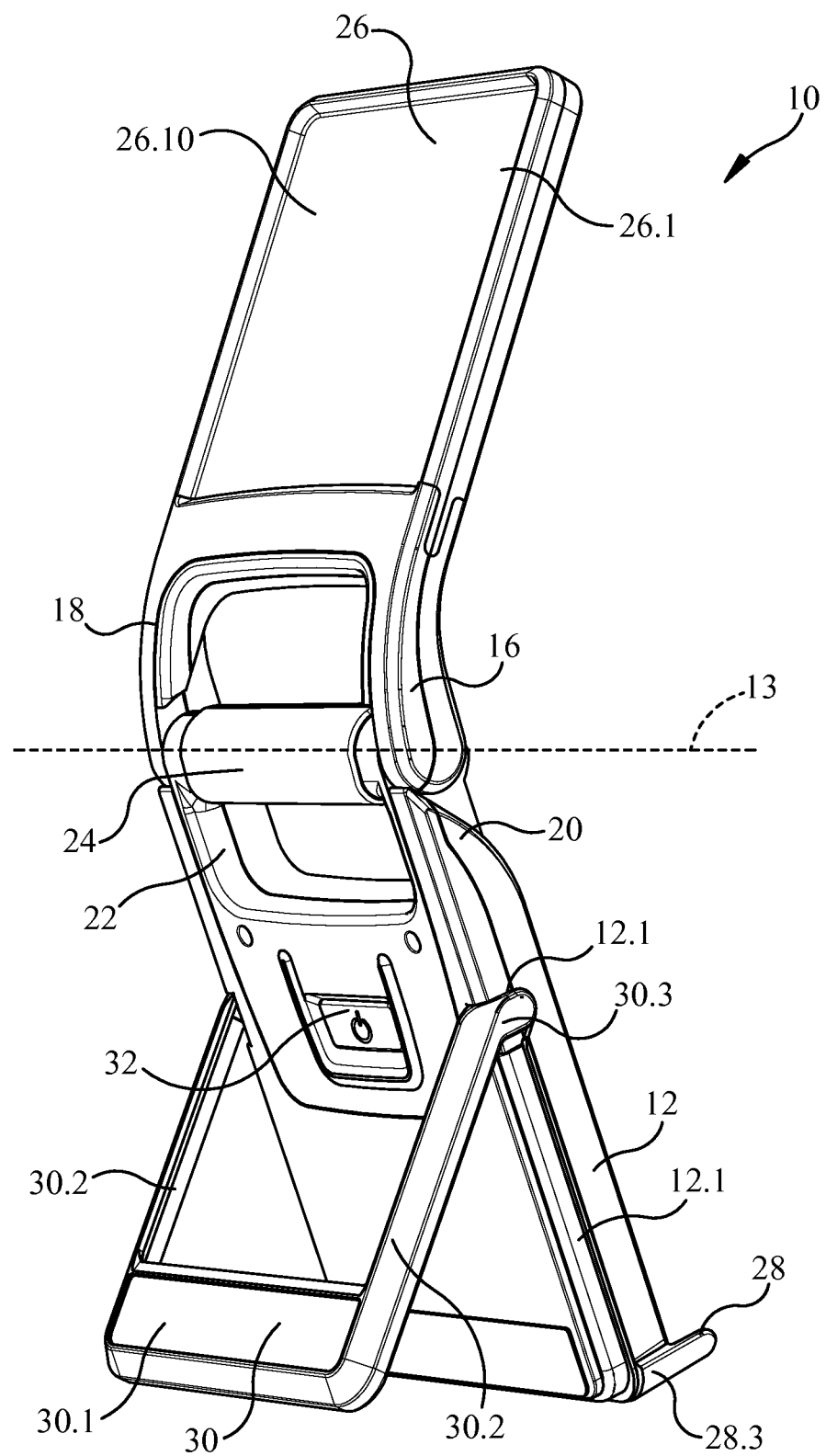
FIG. 5 illustrates a rear perspective view of the lighting device of FIG. 4.

As is illustrated in FIG. 5, the base housing 12 and light housing 14, in being pivotally connected, are able to pivot around a rotational axis 13 so as to set the light panel 26 at its fullest extent away from the body of the base housing 12. A person of ordinary skill in the art will appreciate that the fullest extent of rotation may vary based on design of the lighting device 10 and the illustrative embodiment is not intended to limit the scope of the present invention.

Extending between the pivots between the light housing left and right arms 16 and 8 and battery housing 12 right and left arms 22 and 20, is a handle portion 24. The handle portion 24, is arranged so as to be co-extensive along, or surrounding the axis of rotation 13 of the base housing and light housing 12 and 14. This arrangement is such that when the lighting device 10 is in the open condition, as illustrated in FIG. 5, a readily accessible handle 24 is provided, which is also readily accessible in the closed condition as illustrated in FIGS. 1 to 3. For example, the handle 24 is accessible in both the extended and closed (e.g., un-extended) state of the device and the handle positioned about the rotational axis of the base housing 12 and the lighting panel 14. The construction of the handle 24 will be discussed in more detail with respect to later drawings.

As illustrated in FIGS. 1 and 5, the base housing 12 also has pivotally attached to it, a stand 30 which is made up of a base 30.1 and two legs 30.2, which both terminate in a dog leg section 30.3, where a pivot is located which connects to and is pivotally held inside the base housing 12. A person of ordinary skill in the art will readily appreciate that a variety of mechanisms may be used to secure the legs 30.2 to the base housing 12 and to allow the legs 30.2 to pivot in order to extend the base housing 12. Such mechanisms may include a rivet, screw, and a linear member that matingly engages with ends of legs 30.2, for example.

Figure 4:
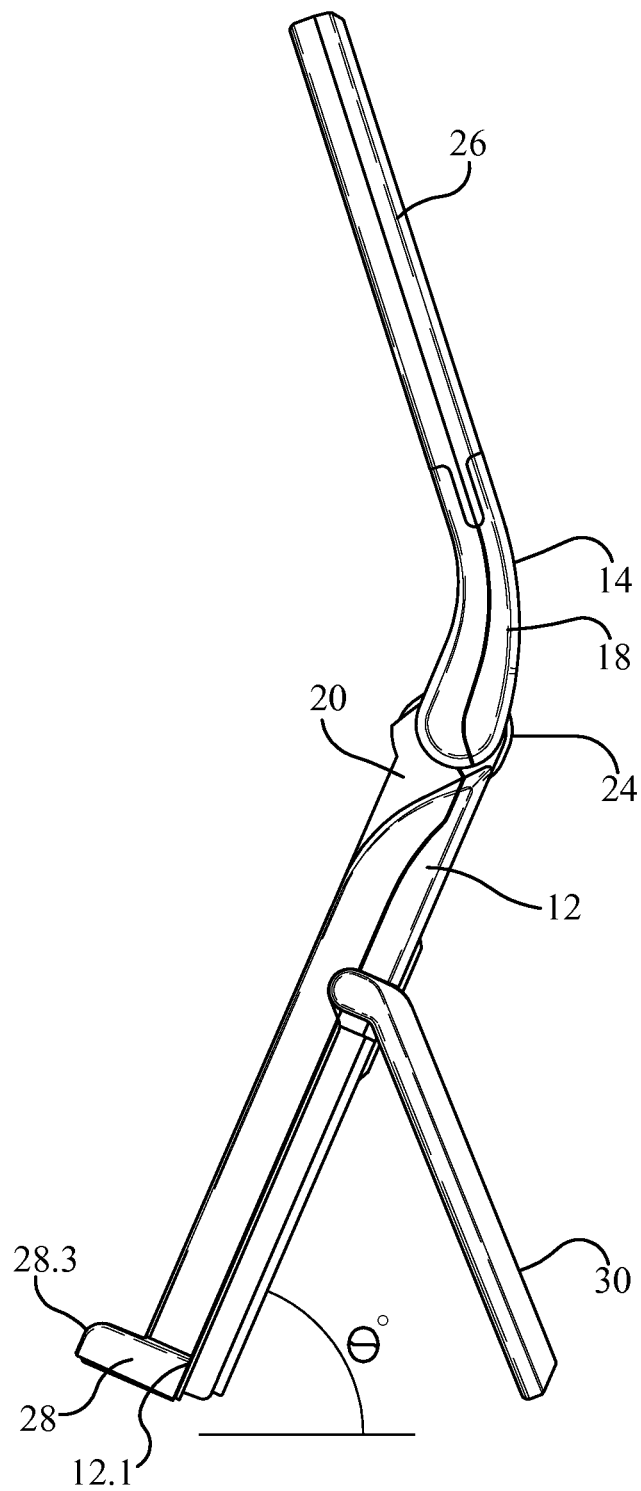
FIG. 4 illustrates a side view of the lighting device in the open or deployed condition.

It will be seen from FIG. 1 and FIG. 5 that the base housing 12 has a shoulder 12.1 formed in its side, which permits the dog leg 30.3 of the stand 30 to bear against, in order that the stand 30 will not rotate past a predetermined position generally equivalent to that as illustrated in FIGS. 4 and 5.

The stand 30 enables positioning of the body 12 at an angle to the horizontal, the angle θ of FIG. 4, which will have the effect of ensuring that the lighting panel 26 is at an angle to the vertical which is preferably an optimum angle for light to shine in a direction normal to the surface of the lighting panel 26 for camping and other purposes. It is for this reason that the angled portion or dog leg on the light housing 14 arms 16 and 18 is provided at a location close to the point of pivoting to the base housing 12. In addition to adjusting the stand 30 to position the lighting panel 26 in a desired position, the lighting panel 26 may also be pivotally positioned in the desired position.

Providing the handle 24 along the rotational axis of the pivot formed between the base housing 12 and the lighting housing 14 ensures that the lighting device 10 will be reasonably balanced in either orientation, namely in the collapsed state of FIG. 1 or the extended state of FIG. 5. In other words, providing the handle 24 along the rotational axis of the pivot ensures that the lighting device 10 will be balanced in both the closed and extended states.

Figure 7:
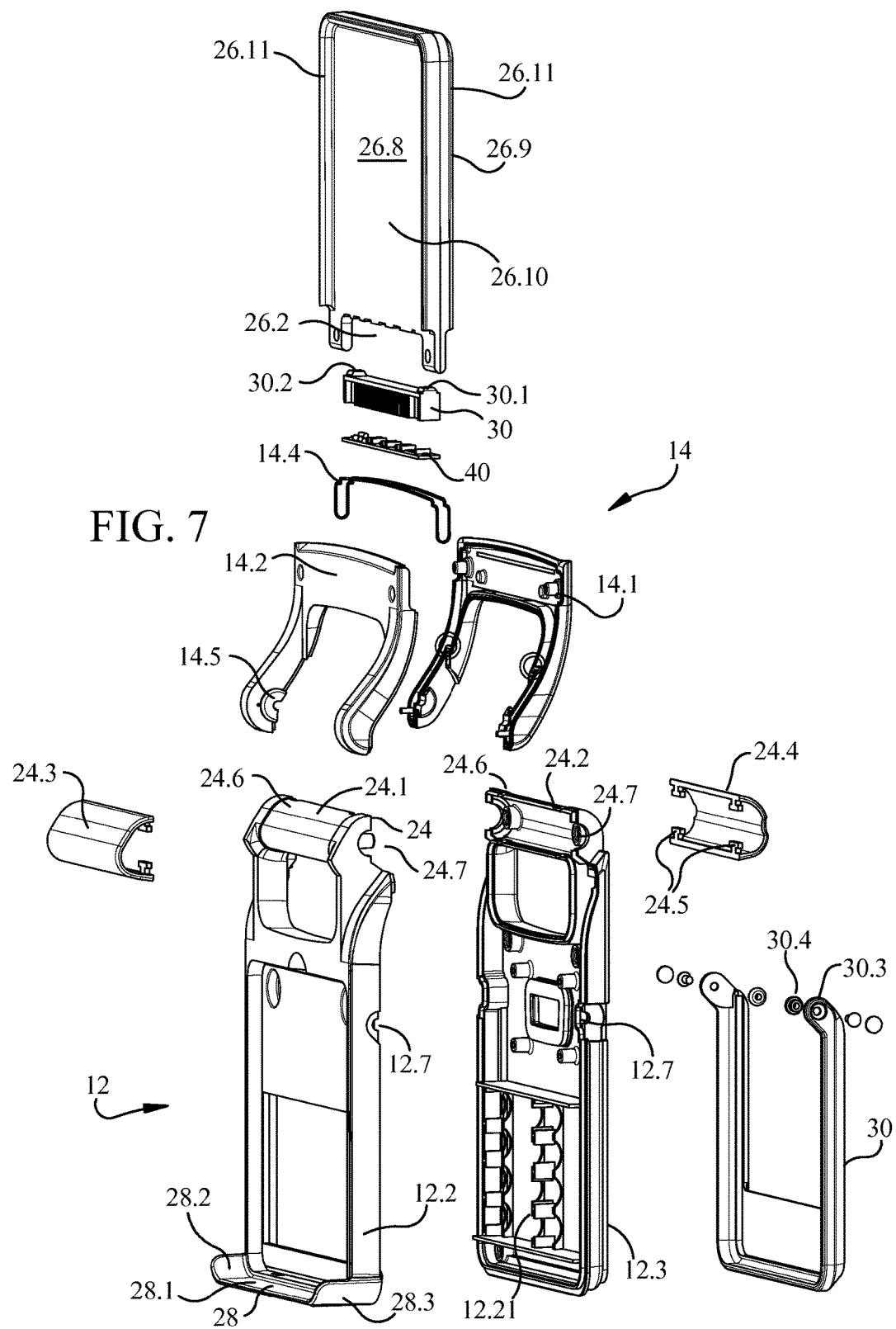
FIG. 7 illustrates an exploded view of some of the components of the lighting device.
Figure 8:
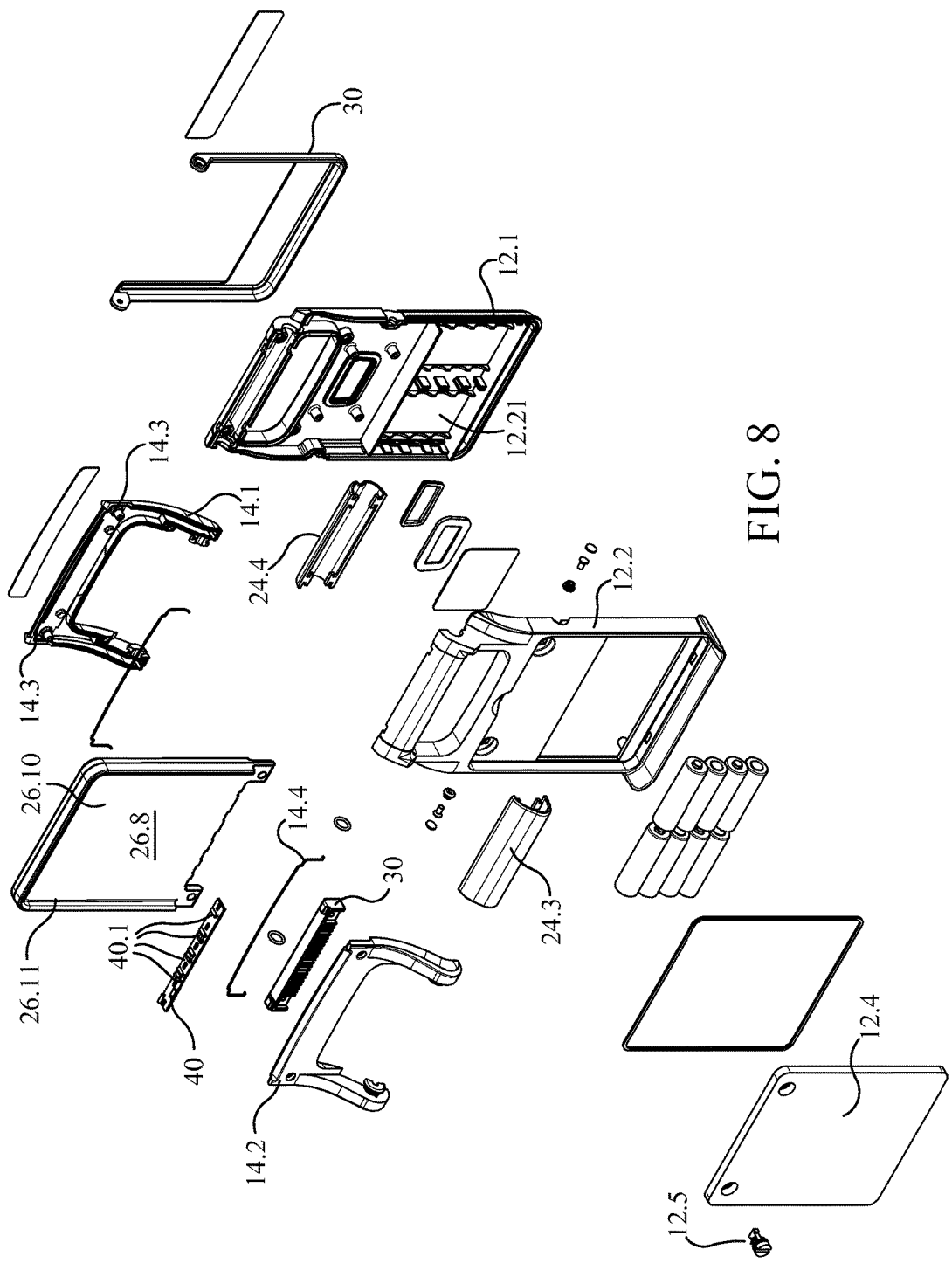
FIG. 8 illustrates an exploded view of all components making up the lighting device.

As is best seen in FIGS. 7 and 8, the handle 24 may be formed primarily in the base housing 12 such that half the handle 24.1 is formed on the forward portion 12.2 of the housing 12 while the other handle half 24.2 is formed on the rear portion 12.3 of the base housing 12. This exemplary embodiment is not intended to limit the scope of the present invention. In another embodiment, the handle 24 may be formed primarily on the light housing portion 14. In yet another embodiment, the handle 24 may be formed from even portions of the base housing 12 and the lighting housing 14.

As is illustrated in FIGS. 4 and 5, the lower rear side and base edge of the base housing 12 are formed with a peripheral inset 12.1 which allows a complementarily shaped internal portion of legs 30.2 and the base 30.1 of the stand 30 to sit snugly and in a streamline fashion relative to the rear of the base housing as is best illustrated in FIG. 3. Such a configuration of peripheral inset 12.1 and complimentary shaped internal portion of legs 30.2 and 30.1 provide for reduced thickness of the lighting device 10 in the closed state for storage, for example.

The base of the battery housing 12, as best illustrated in FIGS. 1, 4 and 5, includes a bottom portion or foot 28 that includes a central base portion 28.1 and a left and right side curved portions 28.2 and 28.3. The curved portions 28.2 and 28.3 help to keep the light panel 26 centred and adjacent to the base housing 12 when in the retracted condition as illustrated in FIG. 1. They also protect the lower end of the light panel 26 as illustrated in FIG. 1 so that the lower edge of the panel 26 does not engage the ground or a table surface when positioned in the arrangement of FIG. 1. By preventing contact and acting to limit motion of the light panel 26, this also assists in protecting against forces which may otherwise cause the light housing 14 and the location of the panel 26 to misalign or otherwise affect the operation of the LEDs.

Figure 6:
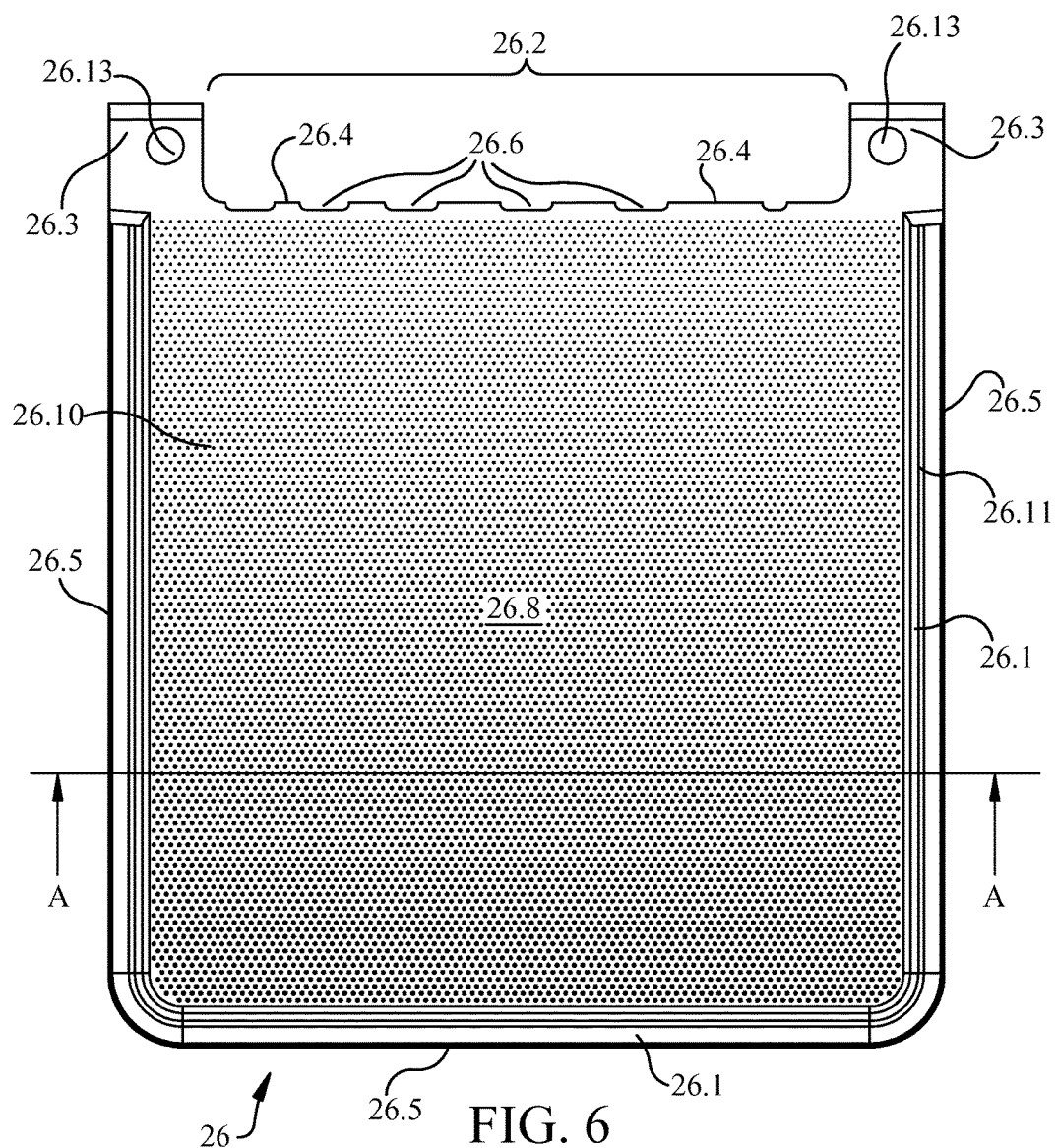
FIG. 6 illustrates a plan view of the light panel and the etching formation thereon.

The light panel 26 may be any desirable size and shape. As illustrated in FIGS. 6-8, the exemplary light panel 26 has a generally square or rectangular arrangement and is elongated and is relatively thin in thickness at approximately 4 millimeters thick at the planar portions 26.10. A person having ordinary skill in the art will readily appreciate that the size and shape of the illustrated light panel 26 is illustrative in nature and not intended to limit the scope of the pending claims.

The sides of the panel 26 may include a flange portion 26.5 that has opposed laterally extending (to the planar portion 26.10) outer edges 26.1. The outer edge 26.1 has an outermost point or line 26.11 away from the surface 26.8 of the planar portion 26.10, such that the surface of the planar portion 26.8 remains distanced from the outer edge 26.1. This has several functions, one of which is to assist keeping the surface 26.8 protected from scratching should the lighting device 10 be placed on its forward face down onto a table or a ground location. Other functions include securing and aligning the lighting panel 26 to the base housing 12 when in the closed state. Yet another function is to provide strength to panel to resist bending in a direction orthogonal to the length of the lighting panel.

As is illustrated in FIG. 6, the front and rear surfaces 26.8 and 26.9 of the planar portion 26.10 are etched with a series of optical elements in the form of dots, so as to assist in the transmission of light and or the reflection of light out of the lighting panel and in a 180° direction from the panel. This occurs from both the front and rear portions of the lighting panel so that when in the orientation of FIGS. 4 and 5, 360° illumination from the light panel occurs. In one embodiment, light from the LEDs is output from distal end of the light housing through the edge 26.1. In another embodiment, light directed to the distal end of the light housing is reflected back to the planar portion 26.10 for output through planar portion.

The location of the optical elements and density of the optical elements may be selected to provide uniform light distribution over the surface of the light panel 26. Therefore, the density and/or size of the optical elements may vary as a function of the distance on the planar portion 26.10 from the LEDs 30. For example, the further away from the LED, the more optical elements and/or larger optical elements are needed to provide for uniform light distribution over the planar portion 26.10. A person of ordinary skill in the art will readily appreciate that the size and shape of the optical elements may include any desirable size and shape and/or combination of sizes and shapes. For example, the shape may be dots, circles, squares, rhombuses, etc.

When the light panel 26 is in the retracted position (also referred to herein as in the collapsed position) of FIG. 1, a reflector (e.g., a white coloured surface on a battery housing cover 12.4) ensures that when the lighting panel is switched on through switch 32, all the light reflects away from the body and radially outward from the front face of the lighting panel, in a 180° manner.

As is illustrated in FIGS. 6-8, the portions of the lighting panel 26 which are captured in the light housing 14, are the ends 26.3 which have apertures 26.13 therein. The apertures 26.13 cooperate with spigots 14.3 (see FIG. 8) on the rear half of the light housing 14.1 to secure to secure the lighting panel 26 to the light housing 14. The lighting panel 26 may be secured in position by a single screw on either side of the light housing 14 and the light panel 26 is thus held in a cantilever fashion in the light housing 14. A person of ordinary skill in the art will appreciate that the disclosed method of securing the lighting panel 26 to the light housing 14 is illustrative in nature and not intended to limit the scope of the claims.

The light panel 26, between the ends 26.3 has a curved region (e.g., a U-shaped, bight) 26.2 along one edge of the panel 26. The curved region 26.2 includes a series of recesses, whereby recesses 26.4 are located at either end and recesses 26.5 are between recesses 26.6.

The recesses 26.4 receive projections 30.1 and 30.2 on a heat sink 30 that is closely coupled or joined to the printed circuit board 40, which is illustrated in FIG. 7. The printed circuit board 40 is positioned between the heat sink 30 and the edge of the light panel 26 in the final assembly. The printed circuit board 40 is mounted between the projections 30.1 and 30.2, and is held there by a heat transmitting compound which ensures the two components won't move with respect to each other and that any heat generated by the circuitry on the printed circuit board 40 can be drawn away by means of the heat sink 30.

With the projections 30.1 and 30.2 sitting inside the recesses 26.4, the LEDs on the printed circuit board may be aligned to sit within the recesses 26.6. The LEDs utilized on the printed circuit board 40 may be any desirable type, size and shape. In one embodiment, the LEDs are of the generally square or rectangular type and relatively shallow, approximately the same depth as the depth of the recesses 26.6 illustrated in FIG. 6.

The printed circuit board 40 is assembled and secured between the light panel 26 and the heat sink 30. The printed circuit board 40 is mounted and clamped between the front and rear portions 14.1 and 14.2 of the light housing 14, which ensures that the LEDs are in the correct position to radiate light directly into a proximal edge (edge of light panel 26 closest to the LEDs) of the light panel 26.

In order that the lighting panel 26 is sealed relative to the two parts 14.1 and 14.2 of the light housing 14, an elastomeric seal 14.4 is provided. The elastomeric seal may be any type of seal. The elastomeric seal makes contact with the surfaces around the curved region 26.2 so as to protect the printed circuit board 40 from any condensation or moisture that might gather on the lighting panel 26 and would otherwise gain access to the electronic components. The seal 14.4 ensures that liquid cannot gain access to the printed circuit board 40 when the light panel 26 is in the extended condition illustrated in FIGS. 4 and 5. When the light panel is in the closed condition as illustrated in FIG. 1, the effect or influence of the seal 14.4 is minimal as the upper portions of the light housing 14 prevent access of ingress of water into the light housing 14. Between the components of the light housing 14 can also be provided a seal mechanism so that when the parts are secured together by screws that ingress of water is greatly restricted.

Referring to FIGS. 7-8, the handle portions 24.1 and 24.2 respectively receive an elastomeric covering material 24.3 and 24.4. These covering materials are formed so that they are produced in matching halves and each half has a securing lug 24.5 at both ends of both edges in order that the lugs 24.5 may be captured inside recesses 24.6 on the upper and lower edges of the handle portions 24.1 and 24.2. The lugs 24.5 and recesses 24.6 ensure that the halves of the base housing 12 can be assembled together in proper alignment and once assembled and secured, the coverings 24.3 and 24.4 are firmly held in the handle portion 24 of the battery housing 12.

At either end of the handle portions 24.1 and 24.2 are semi-circular apertures 24.7 that allow a circular or cylindrical projection 14.5 formed on the light housing 14 to be captured, when the handle is secured by screws. This forms the pivot arrangement between the light housing 14 and base housing 12. The pivot arrangement formed in the handle enables the user to easily hold the lighting device 10 when the device is in a collapsed state as well as in an extended state, for example.

At an intermediate location along the sides of the base housing 12 is a similar semi-circular cut-out 12.7 (FIG. 7) on both the front and rear portions of the base housing 12.3 and 12.2. These half apertures 12.7 enable the capture of a plastic pivot 30.4 (FIG. 5), which is in turn secured to the upper portion or dogleg of the handle 30.3. In this way, the stand 30 can be pivotally secured to the body of the base housing 12.

To assemble the components, first the light panel 26, the LEDs and heat sink 30 and 40 respectively, may be secured in place and assembled to the light housing 14 via their respective halves 14.1 and 14.2 (FIG. 7). When these components are secured the half cylindrical pivots 14.5 form a full pivot structure and can then be captured within the semicircular recesses 24.7 in the handle making a relatively speedy assembly for a relatively complex lighting device.

As is illustrated in FIG. 8, the seal 14.4 is shown in two halves. The seal 14.4 may be provided in either a single integral seal or a co-moulded seal formed on each half of the lighting light housings 14.2 and 14.1, for example.

If desired, between the light housing 14 and the capturing handle portion 24.7, a ratchet mechanism can be provided whereby the light panel 26 can be rotated at specific or at intermittent angles or at specific angles or spacings of 5° through its motion. Without such movement controls the light panel 26 may be positioned at any angle desired by the user.

As is illustrated in FIG. 8, the base housing 12 includes a battery housing 12.21 which is designed to receive eight AA batteries at a lowermost location on the base housing 12, with the batteries being arranged horizontally. The battery housing 12.21 is then covered by the covering panel 12.4 which is readily removed from the forward portion of the battery housing 12 by means of screws 12.5, which may be of the threaded variety or of a bayonet type. A person of ordinary skill in the art will appreciate that disclosed number of batteries, types of batteries and/or configuration of the battery housing 12.21 is illustrative in nature and not intended to limit the scope of the present invention. Any type and size of battery and configuration of battery housing is deemed to fall within the scope of the present invention.

The light panel 26 has the flanges 26.5 integrally formed with the light panel 26. The flange 26 extends laterally from the surfaces 26.8 in one direction and 26.9 in the other direction of the light panel 26. One function of flange 26.5, as described above, is that it helps assist the surface 26.8 from being scratched. However flange 26.5 has two additional functions. One is to increase the strength and rigidity of the relatively thin formation of the planar portions 26.10 of lighting panel 26 by providing the panel with a strong laterally projecting flange in either direction from the center plane of the lighting panel 26. This yields a cross section as illustrated in FIG. 13, when taken laterally through the light panel as illustrated in FIG. 6 in the direction of arrows A.

Figure 13:
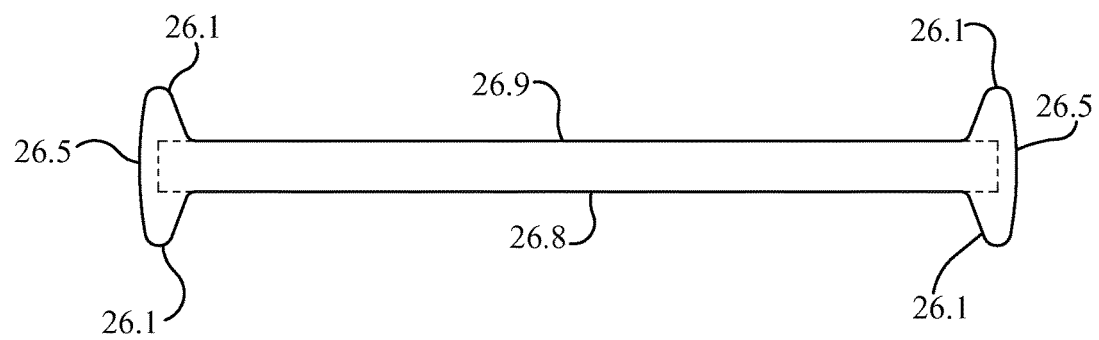
FIG. 13 illustrates a cross sectional view through a mid height of the lighting panel of FIG. 12, or through line A-A of FIG. 6.
Figure 15:
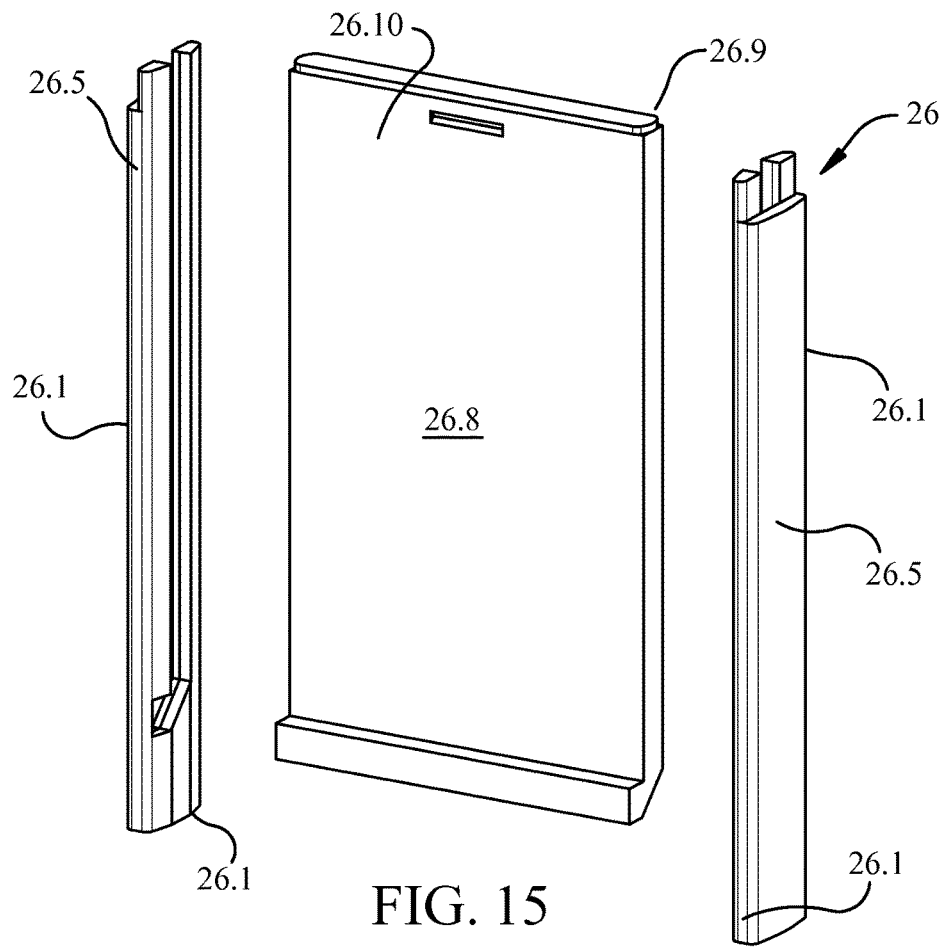
FIG. 15 illustrates an exploded perspective view of an improved lighting panel similar to that of FIG. 12.

FIG. 13 illustrates a cross-section of the lighting panel 26. The cross-section of the lighting panel can be generally described as I-shaped or H-shaped, and acts in a similar manner as an I-beam or H-beam type section. It will be noted that the extremities of the flanges 26.5 have a radius, which provides good light emission from these surfaces. The cross-section will have the outer periphery of the illustration of FIG. 13 if manufactured from a singe or integral moulding or extrusion. Whereas the broken line work in FIG. 13 indicates where surfaces meet or join lines occur if the flanges 26.5 were made separately and joined to the planar portion 26.10, as is illustrated in FIG. 15. A person of ordinary skill will appreciate that the cross-section illustrated in FIG. 13 is exemplary in nature and not intended to limit the scope of the present application.

A second function of the surrounding flange 26.5, which is located along each free edge of the light panel 26, is that in respect of the embodiment of FIGS. 1 to 8, this will provide by virtue of the manufacture of the ridge in the same acrylic or transparent polymethyl methacrylate (PMMA) or other suitable material as the light panel 26, an edge omitting formation so that light can be transmitted from these edge flanges 26.5. This assists in the production of 360 degree light in respect of the embodiment of FIGS. 1 to 8. For example, as explained above in paragraph, light from the LEDs is output from distal end of the light housing through the edge 26.5. In another embodiment, light directed to the distal end of the light housing is reflected back to the planar portion 26.10 for output through planar portion.

Figure 9:
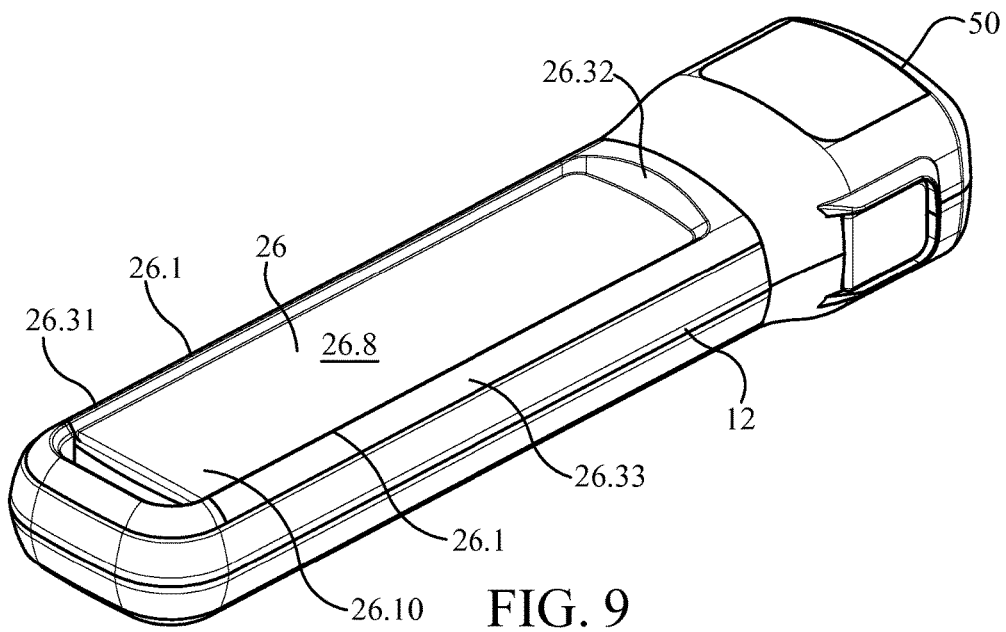
FIG. 9 illustrates a lighting device with the improved lighting panel.
Figure 10:
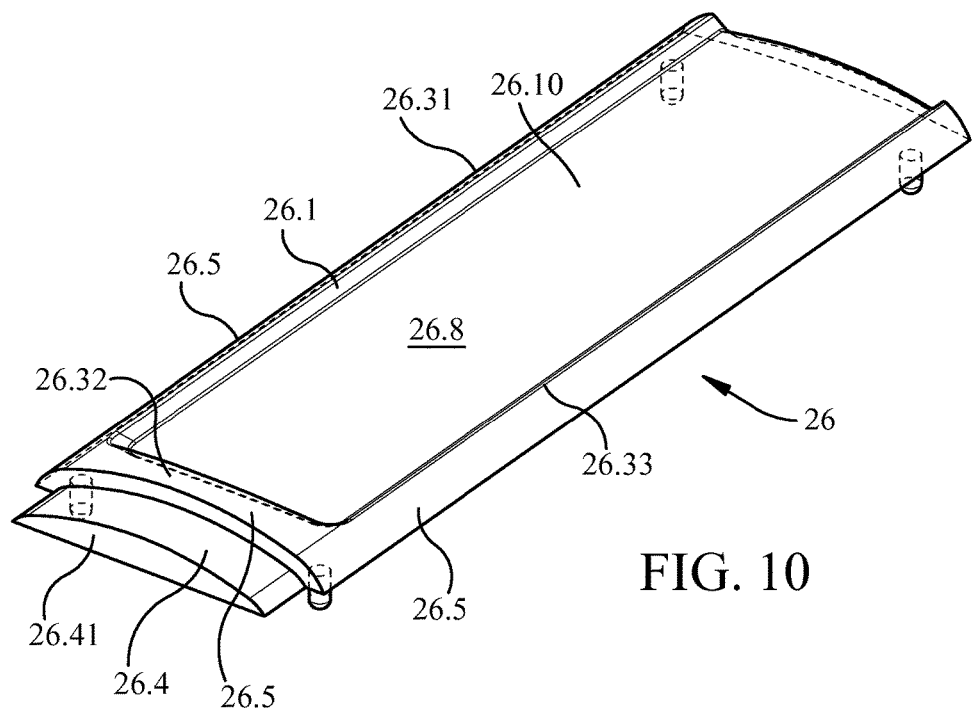
FIG. 10 illustrates a perspective view of the lighting panel used by the lighting device of FIG. 9.

FIGS. 9 and 10 illustrate another embodiment of a lighting panel 26 on a lighting device in accordance with aspects of the present invention. The lighting device provides both an area light from the panel 26 and a flashlight from the light housing 50 at the other end of the flashlight. The lighting panel 26 has side flanges 26.5 around its exposed edges 26.31 and 26.33 and a protected edge 26.32 (FIG. 10). The flange 26.5 or more accurately a half flange 26.5, as it extends from the planar surface 26.8 of the light panel in one direction, along the edges 26.31, 26.32 and 26.33, serves a similar function to the flange 26.5 of FIGS. 1 to 8, in that it provides some strength and rigidity to the light panel 26 which can assist during construction of the lighting device of FIG. 9, and further provides laterally directed surfaces (relative to the planar portion 26.8) so that light can be emitted from these surfaces in such a way that the light panel 26 of FIG. 10 is able to emit light in approximately 180°.

The light panel 26 of FIGS. 9 and 10 outputs light at 180° for light emission because its underside is placed adjacent to the body 12 of the flashlight or lighting device thereby restricting the lighting panel 26 to only emitting light in approximately 180° relative to the body 12. In the embodiment of FIGS. 9 and 10 the flange 26.5 extends in one direction lateral to the surface of the lighting panel portion 26.8, as the underside does not require the functional features of these flanges. Thus in cross section through a mid section of the light panel 26 of FIG. 10, a channel shaped or C-shaped cross will be evident, or if a cross-section were taken through a portion of a free edge of the light panel 26, then an L-shaped cross section will be evident. By contrast a cross section through a portion of the free edge for the panel of FIG. 6, a T-shaped cross section would be evident.

The lighting panel 26 of FIG. 10 also includes a forward flange 26.4, the front face 26.41 of which allows light to be received from LEDs located adjacent thereto, so that light can be transmitted into the light panel for emission therefrom from other surfaces.

Figure 11:
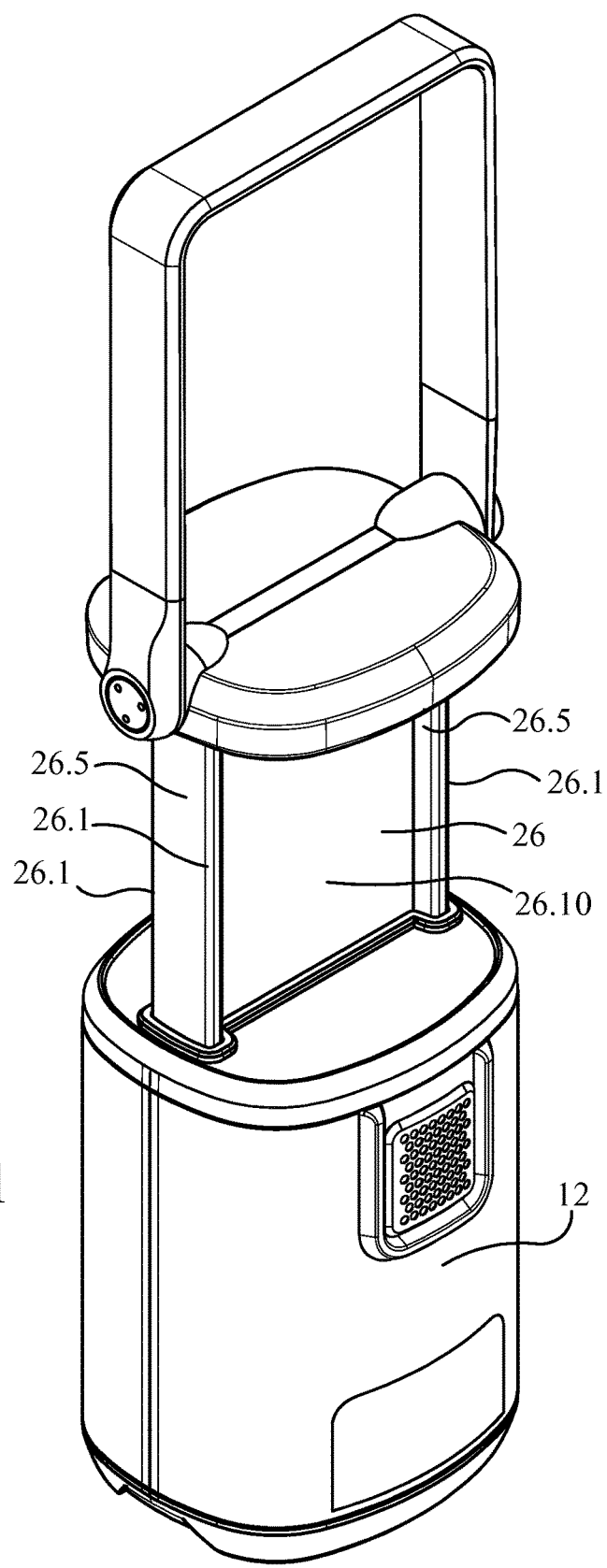
FIG. 11 illustrates a further lighting device having an improved lighting panel.
Figure 12:
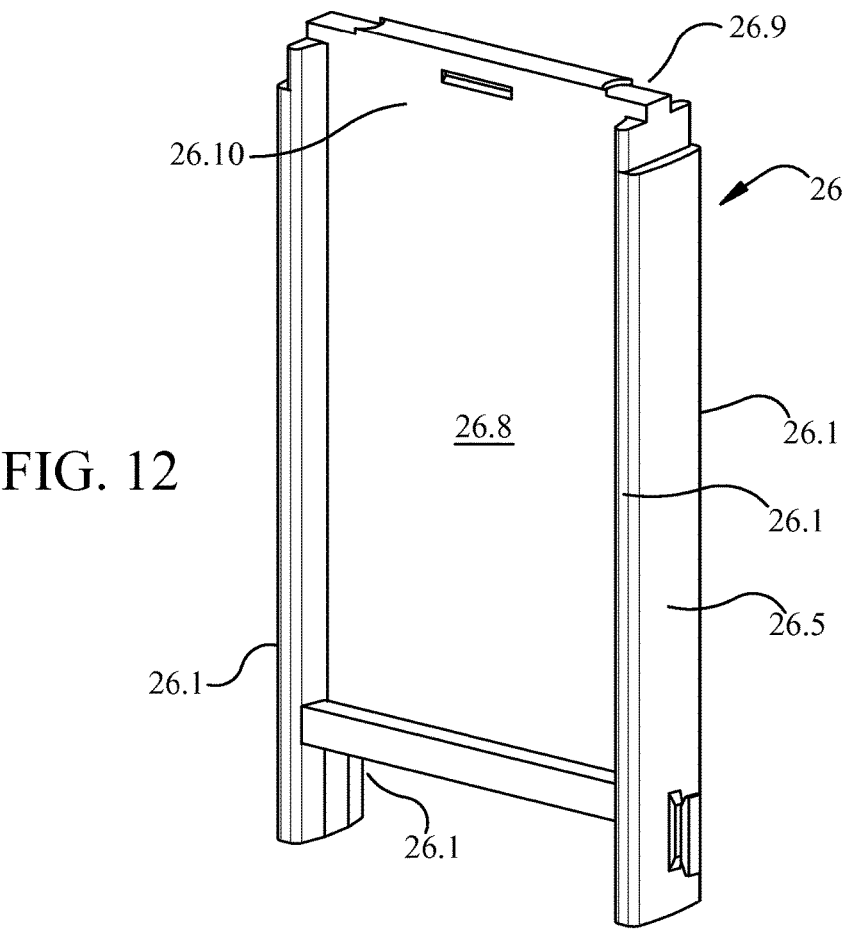
FIG. 12 illustrates the lighting panel in perspective view on the device of FIG. 11.

Illustrated in FIG. 11 is a lighting device 110 which has a light panel 26 as illustrated in FIG. 12. The lighting device 110 functions as a lantern. The lighting device 110 has a body 12 and a light panel 26. The lantern is constructed so that the light panel 26 can be slid out of the body by exerting a tensile force on the handle at the top of the lighting device. It will be noted from FIGS. 11 and 12 that the light panel 26 is of a substantially I-shaped or H-shaped construction. The light panel includes, as a substantial portion of it, a planar portion 26.10, with front and rear surfaces 26.8 and 26.9 and laterally extending flanges 26.5 along two of its opposed side edges, which include outer edges 26.1 extending in both directions from the planar portion. This construction gives relatively high dimension of strength to the lighting panel 26, and as described above provides additional surfaces to radiate light away form the panel 26 in a 360 degree fashion.

While the above description refers to the light panel 26 and its flanges 26.5 being integrally moulded, it is possible to make the light panel 26 from a generally planar portion 26.10 as a generally rectangular prism, and attach to its edges where required, flange portions 26.5, as is indicated in FIG. 13 by means of the broken lines, which are here indicating the interface between the planar portion and the flanges. In addition, the flanges 26.5 could be co-moulded, bonded or joined in any suitable manner.

Figure 16:
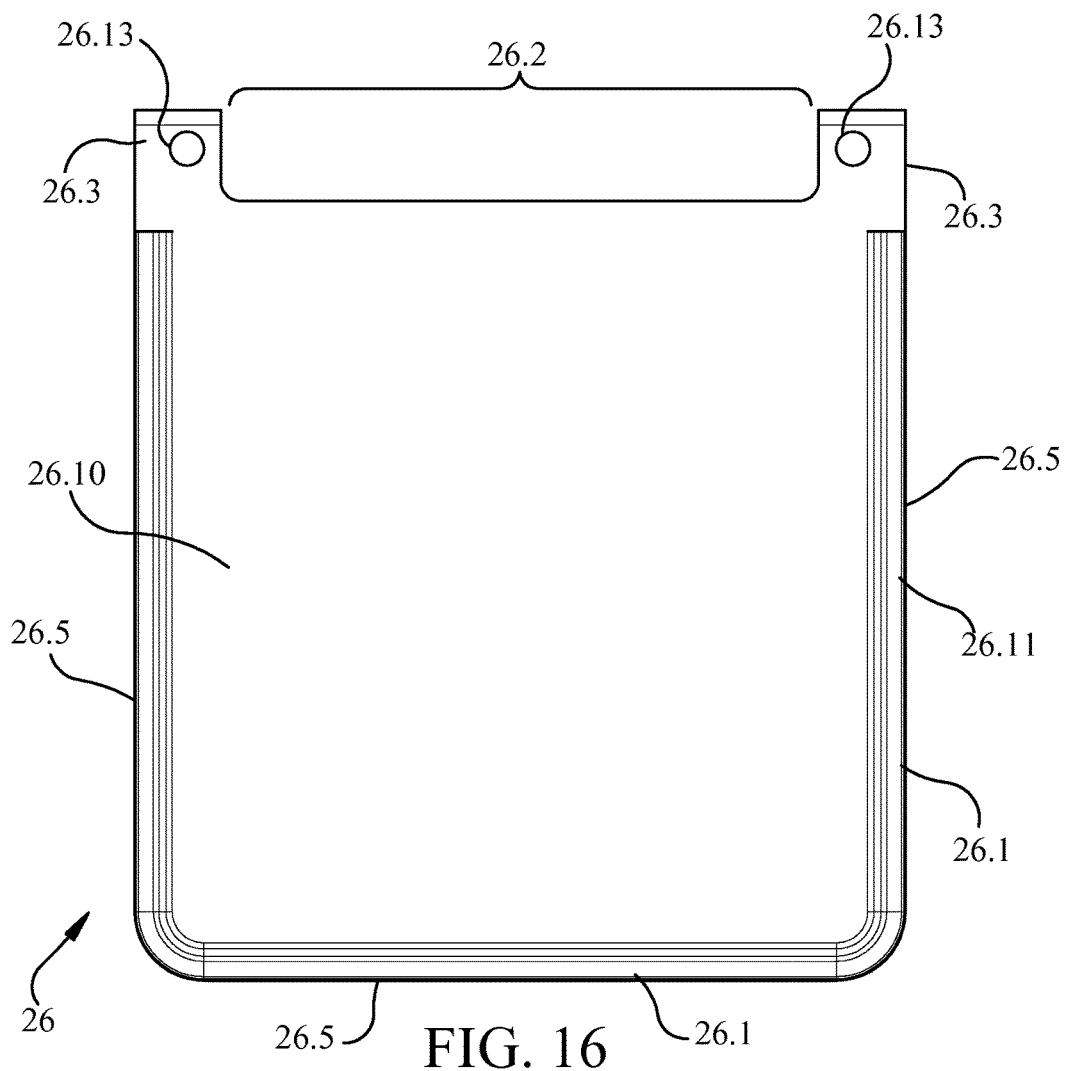
FIG. 16 illustrates another exemplary lighting panel in accordance with aspects of the present invention.

Referring to FIG. 16, another light panel embodiment is illustrated in accordance with aspects of the present invention. The light panel of FIG. 16 includes curved region (e.g., bight) 26.2, but LED recesses 26.4 and heat sink recesses 26.6 are no longer required in the panel. In the previously described embodiments, the flanges 26.5 can be integrally molded with the generally planar portion 26.10, or made separate therefrom and attached thereto by any appropriate means or mechanism, such as by bonding or co-molding. While the previously described embodiments also describe the flanges 26.5 being of the same material as the generally planar portion 26.10, if desired the flanges 26.5 can be of a different material to the generally planar portion 26.10. The different material can have the same or similar light transmission characteristics as the generally planar portion 26.10, or different light transmission characteristics depending upon what lighting effect it may be desired to achieve at the free edges 26.1 of the generally planar portion 26.10. Further, whether the light transmission the characteristics are the same or different as the generally planar portion 26.10, the material properties can be selected to assist with the protection role of the flanges 26.5. Thus the material may include elastic materials with appropriate light transmission characteristics, or a coating of elastic material to achieve a similar effect.

Figure 14:
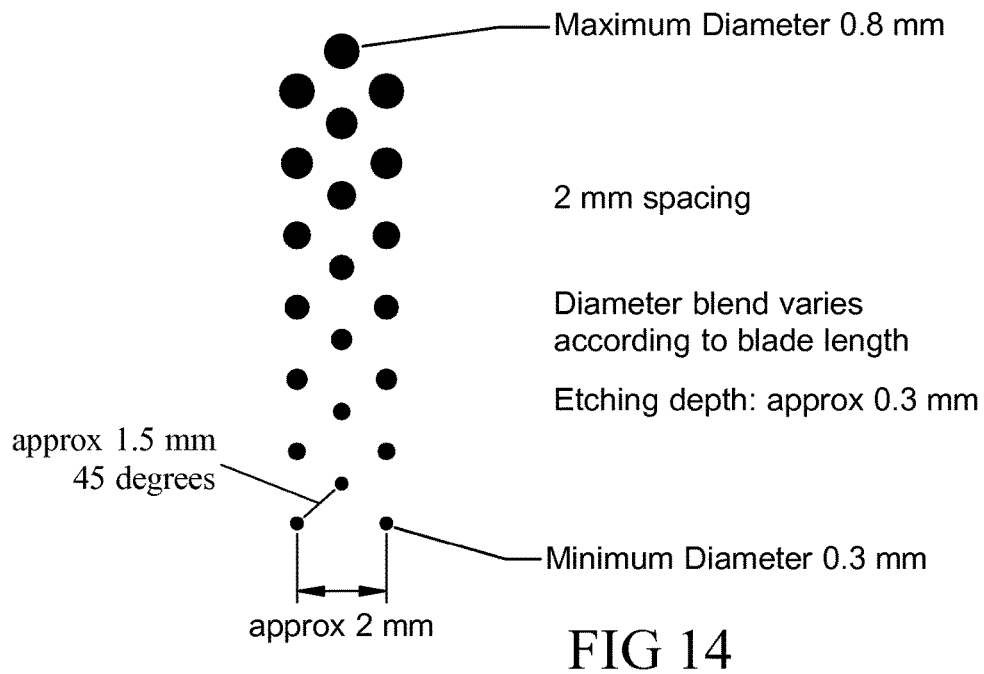
FIG. 14 illustrates the etching details for use with the panel of FIG. 6.

Illustrated in FIG. 14 is a diagram showing the arrangement and etching details to produce the etching formations (also referred to herein as optical elements) on the light panel as illustrated in FIG. 6. The schematic illustration has the smallest cylinders of a minimum diameter of 0.3 mm being formed on the light panel 26 planar surface 26.8, or 26.8 and 26.9, at a location where the surfaces 26.8 and 26.9 are exposed and closest to the LEDs. As illustrated in FIG. 6, the whole surface is covered, however as the blade extends away from the light source a 2 mm row spacing is observed, and the cylinders are gradually increased in diameter up to the maximum diameter of 0.8 mm. Depending upon the length of the light panel 26, this will mean some adjacent rows may have the same diameter.

The etchings (optical elements) are referred to as cylinders, because each circle will be laser etched to a depth of approximately 0.3 mm. It will be also noted from FIG. 14 that the columns of etched cylinders are offset by a half row spacing, and that third column of cylinders lies 2 mm away from the first column on the left, with the second column being the one offset by a half row spacing. This array is arranged to cover the whole planar surfaces 26.8 and 26.9 or, if desired, particular effects can be produced by providing etched cylinders at different intervals or spacing. It will be noted from FIGS. 6 and 14 that the series of etched formations are spaced at closer distances to each other in a direction away from the light source. This provides a graduated effect from top to bottom as illustrated in FIG. 6, whereby the upper portions are denser with etched surface than the lower portions.

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It will be understood that the invention disclosed and defined herein extends to all alternative combinations of two or more of the individual features mentioned or evident from the text. All of these different combinations constitute various alternative aspects of the invention.

The invention has been described with reference to the preferred embodiments. Of course, modifications and alterations will occur to others upon reading and understanding the preceding description. It is intended that the invention be construed as including all such modifications and alterations insofar as they come with the scope of the appended claims and their equivalents.

What is claimed is:

1. A lighting device comprising a base housing to receive one or more batteries therein to power a light source located in a light housing, the light housing being pivotally attached to said base housing at pivot points on both sides of said base housing; a tubular handle extending along the axis of rotation in between said pivot points; and a printed circuit board (PCB) having at least one light emitting diode (LED) thereon, and a lens with a planar section extending away from the at least one LED, and the at least one LED is arranged so as to emit light into an edge of the lens.

2. The lighting device as claimed in claim 1 wherein said base housing and said light housing each include a body and at least one arm extending from opposed sides of the respective body.

3. The lighting device as claimed in claim 1 wherein said tubular handle is formed on said base housing.

4. The lighting device as claimed in claim 1 wherein said light housing is positioned between a front portion and a rear portion of said base housing.

5. The lighting device as claimed in claim 1 wherein said tubular handle includes a mechanism configured to secure a portion of a handle covering material thereon.

6. The lighting device as claimed in claim 1 wherein said base housing is pivotally secured to a stand when assembled.

7. The lighting device as claimed in claim 1 wherein the lighting device is a hand-held device.

8. A light panel assembly for a portable lighting device, said light panel assembly comprising: a printed circuit board (PCB) having at least one light emitting diode (LED) thereon, and a substantially planar thin lens extending away from said at least one LED, said at least one LED being arranged so as to emit light into an edge of said lens, wherein the lens includes a flange extending along an outer periphery of said lens away from said edge to emit light from said light panel assembly.

9. The light panel assembly of claim 8, wherein the lens includes at least one recess to receive said at least one LED and said PCB.

10. The light panel assembly as claimed in claim 9 wherein said light source includes a recess for each LED on said PCB.

11. The light panel assembly as claimed in claim 8 further comprising a heat sink attached to said PCB.

12. The light panel assembly as claimed in claim 8 wherein said heat sink includes one or more projections thereon that extend towards said lens.

13. The light panel assembly as claimed in claim 8 wherein said lens includes a respective recess for each projection on said heat sink.

14. The light panel assembly as claimed in claim 13 wherein each respective recess is included in a bight formed along an edge of said lens.

15. The light panel assembly as claimed in claim 8 wherein said lens includes an array of dots or shapes etched thereon to assist in the reflection or transmission or emission of light from the lens.

16. The light panel assembly as claimed in claim 8 wherein said lens is cantilevered in said light housing.

17. The light panel assembly as claimed in claim 13 wherein each respective recess is located in a bight.

18. The light panel assembly as claimed in claim 17, wherein securing apertures are located at either side of said bight.

19. The light panel assembly as claimed in claim 8 wherein a seal is provided between the light housing surface and a surface of said lens.

20. The light panel assembly as claimed in claim 19 wherein said seal extends across a portion of the width of said lens in the vicinity of said PCB and LEDs.

21. The light panel assembly as claimed in claim 8 wherein the light panel is configured to be placed in the hand-held lighting device.

22. A lighting panel for a portable lighting device, said lighting panel configured as a lens having at least one exposed planar surface forming a substantial portion of the lighting panel for emitting light from the portable lighting device and said exposed planar surface having a periphery defined collectively by a light incident edge and one or more free edges, said lighting panel including around its periphery a flange extending in a lateral direction away from the planar surface, wherein each free edge of said lighting panel includes said flange which extends away from said light incident edge.

23. The lighting panel as claimed in claim 22 wherein said lighting panel includes a front planar surface and a rear planar surface and said flange extends in opposed directions away from said front planar surface and said rear planar surface.

24. The lighting panel as claimed in claim 22 wherein a cross section of a portion of the lighting panel has one of an L-shaped configuration, a T-shaped configuration, an H-shaped configuration or an I-shaped configuration.

25. The lighting panel as claimed in claim 22 wherein said flange defines a curved terminal edge.

* * * * *